United States Patent
Mazanek et al.

[11] Patent Number: 5,847,037
[45] Date of Patent: Dec. 8, 1998

[54] MIXTURES, PROCESS FOR THE PRODUCTION THEREOF AND USE THEREOF FOR COATINGS

[75] Inventors: Jan Mazanek, Köln; Karl-Heinz Käsler, Bergisch Gladbach; Gebhard Wagner, Odenthal, all of Germany

[73] Assignee: Bayer Aktiengesellschaft, Leverkusen, Germany

[21] Appl. No.: 691,898

[22] Filed: Jul. 24, 1996

[30] Foreign Application Priority Data

Aug. 8, 1995 [DE] Germany ............... 195 29 092.5

[51] Int. Cl.$^6$ ....................................... C08K 3/10
[52] U.S. Cl. ................ 524/413; 524/424; 524/437; 524/436; 524/432; 524/493; 524/457; 524/588; 524/783; 524/837; 524/847; 524/863
[58] Field of Search .................. 524/837, 863, 524/847, 783, 588, 457, 493, 432, 413, 437, 424, 436

[56] References Cited

U.S. PATENT DOCUMENTS

| | | |
|---|---|---|
| 2,457,971 | 1/1949 | Voorhees et al. . |
| 2,574,902 | 11/1951 | Bechtold et al. . |
| 2,650,200 | 8/1953 | Iler et al. . |
| 2,668,149 | 2/1954 | Iler et al. . |
| 2,892,797 | 6/1959 | Alexander et al. ........... 252/313 |
| 4,703,355 | 10/1987 | Cooper ........................ 358/149 |
| 5,360,851 | 11/1994 | Feder et al. . |

FOREIGN PATENT DOCUMENTS

| | | |
|---|---|---|
| 0 051 418 A2 | 5/1982 | European Pat. Off. . |
| 0071328 | 2/1983 | European Pat. Off. . |
| 0410899 | 1/1991 | European Pat. Off. . |
| 0430156 | 6/1991 | European Pat. Off. . |
| 1205338 | 2/1960 | France . |
| 2352242 | 4/1975 | Germany . |
| 24 08 896 B2 | 8/1975 | Germany . |
| 44 19 574 A1 | 12/1995 | Germany . |
| 1504363 | 3/1978 | United Kingdom . |
| 9118848 | 12/1991 | WIPO . |

OTHER PUBLICATIONS

DIN EN ISO 2431, (1996).
DIN 53 157 (1987).
International Standard ISO 2431 (1993).

*Primary Examiner*—Melvyn I. Marquis
*Attorney, Agent, or Firm*—Sprung Kramer Schaefer & Briscoe

[57] ABSTRACT

Novel mixtures containing in the anhydrous state at least one polysiloxane, at least one reactive extender, at least one unreactive pigment and/or an unreactive extender, at least one lamellar or fibrous solid, at least one reactive (oligo) silane, optionally together with further additives, to a production process and to the use thereof.

12 Claims, No Drawings

MIXTURES, PROCESS FOR THE PRODUCTION THEREOF AND USE THEREOF FOR COATINGS

The present invention relates to novel mixtures containing in the anhydrous state at least one polysiloxane, at least one reactive extender, at least one unreactive pigment and/or an unreactive extender, at least one lamellar or fibrous solid, at least one reactive (oligo)silane and optionally further additives, to a production process and to the use thereof.

Porous mineral substrates, such as construction materials made from calcareous sandstone, concrete or facings, renders and the like, may be protected against environmental influences by various methods.

Coating the construction materials and/or facings with film forming coatings has become the prevalent method.

According to the prior art, these coatings substantially consist of organic polymer dispersions (binders), pigments and extenders and, in some cases, contain polysiloxanes in order to improve water repellency.

The construction and construction material industry's efforts to reduce usage of organic polymers, or preferably to avoid them entirely, in order to obtain more environmentally compatible coatings, led to the development of silicate paints. These largely inorganic coating systems substantially consist of water soluble silicates, into which are incorporated small quantities of organic polymer dispersions together with pigments, extenders and optionally polysiloxanes to increase water repellency.

However, such coating systems have the disadvantage that, at the early stages of curing, they are insufficiently resistant to rain and other atmospheric influences, such as dirt and/or microorganisms.

The object of the present invention is to provide water repellent coatings which cure adequately at temperatures below 100° C., preferably at room temperature, and have the lowest possible content of organic polymers.

It has now been found that mixtures which, in the anhydrous state, contain certain quantities of
  at least one polysiloxane (component A),
  at least one reactive, preferably inorganic extender (component B),
  at least one unreactive pigment and/or unreactive extender (component C),
  at least one lamellar or fibrous extender (component D) and optionally further additives (component F) and at least one reactive (oligo)silane (component E),
and which have been produced in accordance with a certain process exhibit surprising properties in comparison with the prior art.

The present invention moreover provides mixtures which may be obtained by
  initially introducing 30 to 50 wt. %, preferably 30 to 45 wt. %, particularly preferably 30 to 40 wt. %, of at least one reactive extender or mixture of two or more reactive extenders (component B)) as an aqueous dispersion,
  adding 0 to 5% of wetting agent as an additive (component G)), 10 to 40 wt. %, preferably 20 to 40 wt. %, particularly preferably 20 to 30 wt. %, of at least one unreactive pigment and/or unreactive extender (component C)), optionally adding further quantities of component B), wherein the total of all components B) is at most 50 wt. %, 0.1 to 10 wt. %, preferably 0.5 to 5 wt. %, particularly preferably 1 to 3 wt. %, of at least one reactive oligosilane (component E) and 5 to 20 wt. %, preferably 5 to 10 wt. %, of at least one lamellar or fibrous extender (component D)), which differs from component B) and component C), with stirring and then stirring for 5 to 60 minutes, and
  subsequently adding 0 to 35 wt. %, preferably 0 to 5 wt. %, of further additives (component G)) and 15 to 30 wt. %, preferably 15 to 25 wt. %, particularly preferably 15 to 20, wt. % of at least one polysiloxane or a mixture of two or more polysiloxanes (component A)) with stirring.

The water content of the mixture is 10 to 90%, preferably 20 to 80%, particularly preferably 30 to 70 wt. %. The water contained in the mixture may also optionally contain organic solvents.

Component A) in the mixtures according to the invention is preferably at least one hydroxy- and/or alkoxy-functional polysiloxane which forms emulsions with water or other solvents mixed with water and emulsifiers. For the purposes of the invention, polysiloxanes are, for example, copolymers of polysiloxane and polyester, polyether and/or polyepoxide (or mixtures thereof), as well as linear or branched organopolysiloxanes. The preferably used component A) is a polysiloxane resin or a mixture of two or more polysiloxane resins, as are described in EP-A 51 418, page 3, lines 14–52. Particularly preferred polysiloxane resins are those containing 20–95, preferably 40–80, particularly preferably 40–60 wt. %, of trifunctional structural units of the general formula,

wherein
  R describes any desired organic residue having an Si—C linkage and
  R preferably corresponds to a $C_1$–$C_{14}$ alkyl residue.

Component A) is preferably used as an aqueous emulsion. It is also possible to use A) in an organic solvent, but this has environmental disadvantages.

Component A) may, however, also be present as a mixture of two or more aqueous emulsions. If component A) is used in the form of an aqueous emulsion, its siloxane content is between 5 and 80 wt. %, preferably between 10 and 70 wt. %, particularly preferably between 20 and 60 wt. %. Component A) may, however, optionally contain further solvents in addition to water. At least one emulsifier and/or a rheological additive, for example a thickener, should preferably be added. Both cationic and anionic emulsifiers may be used as the emulsifiers. Nonionic emulsifiers are preferred. Component A) in emulsion form may contain emulsifiers, thickeners and also other auxiliary substances in quantities of 0.5–15 wt. %, preferably of 1–6 wt. %, particularly preferably of 1.5–5 wt. %.

Component A) may contain 0–5 wt. %, preferably 0–2 wt. %, particularly preferably 0–1 wt. %, of a bactericide or fungicide as a further additive. Component A) may consist of pure polysiloxanes and/or oils but may also be present in the form of corresponding emulsions in water and as a mixture with water and further solvents. Component A) may additionally contain catalysts. The content of catalysts may be up to 1 wt. %, relative to component A), wherein conventional condensation catalysts, such as, for example, organotin compounds, organotitanium compounds and organoaluminum compounds, may be used.

In the mixtures according to the invention, component B) comprises any reactive inorganic compounds or inorganic compounds modified with organic residues, which contain reactive groups and are able to react with themselves and/or other components of the mixtures according to the invention. These substances are preferably used in the form of water-dilutable solutions or emulsions thereof. Some examples of component B) are silica sols, silicon esters, organosiliconates, such as for example potassium and/or sodium methyl siliconate, silanes and/or the (partial) hydrolysis products thereof, titanic acid esters, aluminates, zirconium aluminates, aluminum hydroxide, zinc oxide and organically modified extenders of any kind, which contain reactive groups of the above-stated nature, such as for example extenders containing epoxy, amino or unsaturated groups, such as for example quartz, glass, talcum or chalk. In a preferred embodiment of the invention, B) is a mixture of silica sol and zinc oxide. The term extenders also includes substances which, after the reaction according to the invention, are present as solid compounds or reaction products. Thus, for example, liquid titanic acid esters which are incorporated into the coatings may act as educts, as may, for example, isocyanates, preferably aliphatic isocyanates.

The reactive extender B) in the mixtures according to the invention is preferably colloidal silica in the form of a silica sol, alkyl siliconate, aluminum hydroxide or a mixture of these compounds, a silane and/or the (partial) hydrolysis product thereof. Sodium or potassium methyl siliconate is particularly preferred as the alkyl siliconate. The colloidal silica here has an $SiO_2$ content of 5 to 50 wt. %, preferably of 10–40 wt. %, particularly preferably of 15–35 wt. %. In a preferred embodiment of the present invention, component B) is an aqueous silica dispersion having a solids content of 20 to 60 wt. %. One reactive extender for the purposes of the invention is also pyrogenic or precipitated silica in powder form, together with colloidal silica in the form of silica sols. The silica sol particles may also be surface modified using known processes. Optionally modified silica sol as described in DE-B 2 408 896, U.S. Pat. No. 2,892,797, U.S. Pat. No. 2,574,902, U.S. Pat. No. 2,457,971, U.S. Pat. No. 2,668,149 and U.S. Pat. No. 2,650,200 is also preferably used as component B). Silica sols having a particle size of 5 to 100 nm are particularly preferred, with a particle size of 10 to 30 nm being very particularly preferred.

Component C) in the mixtures according to the invention is a pigment or extender in the form of an inorganic, organic and/or metallic substance or mixtures thereof, such as for example aluminum oxide, phosphates and/or carbonates, carbides of magnesium and calcium, nitrides, magnesium oxide, aluminum hydroxide, titanium dioxide, various iron oxides, silicon carbide, zinc oxide, aluminum bronze, tin and zinc dust, phthalocyanine blue, various spinels, carbon black, graphite, glass and enamel powders etc.. C) is very particularly preferably at least one unreactive inorganic pigment and/or at least one unreactive inorganic extender, such as for example iron oxide and titanium dioxide.

Component D) comprises any lamellar and fibrous extenders. Examples which may be cited are mica, kaolin, bentonites, montmorillonites, glass fibers, organic (micro) fibers, aluminum flakes and other metals etc..

Component E) comprises any usual silanes and/or the (partial) hydrolysis products thereof or mixtures of various silanes and/or the (partial) hydrolysis products thereof. They may take the form of aqueous solutions and/or emulsions or dispersions thereof. Solutions of component E) in water are very particularly preferred. A preferred component E) comprises water soluble partial hydrolysis products of functional silanes, such as for example silanes containing amino groups, epoxy and/or hydroxyl groups. Partial hydrolysis products of 3-aminopropyltrisalkoxysilane, 1,2-epoxypropyltrisalkoxysilan Silanes containing carboxyl groups are also preferred.

Any catalysts which accelerate condensation reactions are preferably considered as component F). Particularly preferred catalysts are those catalysing the reaction of hydroxyl groups in silanols or the reaction of silanols with alkoxysilane groups, such as for example organometallic tin compounds. Typical examples of component F) are dibutyltin dilaurate or dibutyltin dioctoate.

Component G) may be any additive known for the production of lacquers and paints, such as for example lacquer additives, such as dispersants, levelling agents, thickeners, defoamers and other auxiliary substances, fungicides, bactericides, stabilizers and inhibitors. Component G) may, however, also be a wetting agent or a polymer or a mixture of two or more polymers, such as for example cellulose, polyether, polyacrylates, polystyrene/acrylates, polyurethanes, plasticizers, together with various inorganic resins, preferably as water dilutable dispersions. G) particularly preferably comprises organic polymer dispersions, such as styrene/acrylate or acrylate dispersions.

The mixtures according to the invention may also contain organic, organometallic and/or inorganic corrosion inhibitors as additives, such as for example phosphoric acid derivatives, various amines, substituted benzotriazoles, nitrosophthalic acid salts, substituted phenols or the like.

The viscosity of the mixtures according to the invention is preferably 15 to 100, particularly preferably 19 to 40 seconds, measured in 4 mm diameter DIN cups to DIN 53 211.

The present invention furthermore provides a process for the production of coating mixtures from the mixtures according to the invention, in accordance with which process, component B) is initially introduced as an aqueous dispersion, after which unreactive pigments and/or unreactive extenders, optionally a wetting agent (component G), component E) (oligosilane) and component D) are added with stirring and further components G), components A) and optionally components F) are then optionally added with stirring.

The coating mixtures are particularly preferably produced using the process according to the invention.

In a particularly preferred embodiment of the present invention, aqueous silica sol is initially introduced in whole or in part as component B), then in the following sequence, unreactive pigments and/or unreactive extenders together with wetting agents are added with stirring and intensively dispersed for 5 to 60 minutes, preferably for 10 to 30 minutes, the remainder of component B), optionally water together with components C) and D) are added with stirring and homogenized, whereupon further components G), such as for example defoamers, are optionally added with stirring, then component A) and optionally dibutyltin dilaurate (component F) are added with stirring and stirred for 5 to 60 minutes, preferably for 10 to 30 minutes.

Dispersions are preferably produced from components A) to G) using those methods used for the production of lacquers, such as high-speed stirrers and other intensive mixing processes. It is preferred to use various auxiliary substances, in particular dispersants, such as polyacrylic acid derivatives, polyphosphates, phosphonocarboxylic acid derivatives, in the production of these mixtures. The coating systems according to the invention and the components thereof may be stabilized and protected from settling by using various organic and inorganic compounds, such as for example bentonites, celluloses, polyacrylates or polyurethane thickeners.

The viscosity of the mixtures according to the invention is preferably 15 to 100, particularly preferably 19 to 40 seconds, measured in 4 mm diameter DIN cups to DIN 53 211.

The present invention also provides a process for the production of coatings from the mixtures according to the invention, wherein the mixture is applied onto the material to be coated and dried for 1 to 600 minutes at temperatures of <100° C., preferably at room temperature or alternatively is applied during the production of the substrate to be used, for example during the production of finished concrete parts. The mixtures are preferably used in the form of an aqueous dispersion.

Virtually any inorganic substrates may be used as the materials to be coated, such as construction materials and construction components made from calcareous sandstone, concrete, tiles, gypsum and facings of the most varied composition. Concrete moldings, thermal insulation materials, calcareous sandstone and facings of any type are particularly preferred. A particularly preferred embodiment of the present invention is the application of the coatings according to the invention onto the materials during the production process. The production of concrete roofing tiles may be cited by way of example here, during which the coatings according to the invention are preferably applied in one or two successive stages adjusted to the course of the production reaction.

Even after drying at room temperature, the coatings according to the invention have sufficient strength in order to be transported and/or otherwise handled. They may, however, also be post-treated at elevated temperatures adapted to the particular intended use. Thus, for example, temperatures of around 70° C. are preferred during the production of coated concrete roofing tiles. The coatings according to the invention are durably resistant to atmospheric influences, soiling and attack by microorganisms immediately after drying.

The coatings according to the invention impart elevated water repellency to the coated material. Due to the absence or low content of organic constituents, they are highly environmentally compatible.

Depending upon their nature and intended use, the materials to be coated may be used pretreated or unpretreated. Any pretreatment may be performed using any known processes, such as for example irradiation.

The mixtures according to the invention are preferably applied onto a solid substrate using spraying, dipping, roller and brush methods. Depending upon requirements, it is possible using such methods to produce coatings having film thicknesses of 5 to 300 µm, preferably of 10 to 150 µm, particularly preferably of 15 to 100 µm.

The present invention also provides the use of the mixtures according to the invention for coating construction materials and facings and renders of any desired type.

The following examples illustrate the invention. The invention itself, however, is not limited to these examples.

Practical Examples

The following substances were used in the examples:
I) Polysiloxanes
   Ia) 47% aqueous emulsion of a hydroxy-functional methylsilicone resin of the average composition $T_{210} D_{23} M_4$ having an average molecular weight of approximately 12000
II) Reactive inorganic extenders
   IIa) 30% aqueous colloidal silica suspension having a BET surface area of 100 $m^2/g$ and a pH value of 10
   IIb) 50% aqueous colloidal silica suspension having a BET surface area of 100 $m^2/g$ and a pH value of 10
   IIc) active zinc oxide from Bayer AG
III) Extenders
   IIIa) talcum: AT 1 from Norwegian Talc Mineral A.S.
   IIIb) chalk: BLP 2 from Omya GmbH
IV) Lamellar and fibrous extender
   IVa) mica: GHL/CM from Luh GmbH
V) Pigments
   Va) Bayferrox Schwartz 303T®: iron oxide from Bayer AG
   Vb) Bayferrox Rot 120 FS®: iron oxide from Bayer AG
   Vc) Bayferrox 605/12 Ü®: iron oxide from Bayer AG
VI) (Oligo)silane
   VIa) aminopropylsilane, 20% in water, from OSI, Düsseldorf
VII) Catalyst
   VIIa) 10% aqueous emulsion of dibutyltin dilaurate
VIII) Deflocculant
   VIIIa) Bayhibit S®: sodium salt of a trifunctional phosphonocarboxylic acid from Bayer AG.

The viscosity of the mixtures used in the examples is between 19 and 40 seconds, measured in 4 mm diameter DIN cups to DIN 53 211.

EXAMPLES 1 AND 1.1

(Comparison)

Instructions for production of the coating material (see Table 1 for quantities, Table 2 for test results):

Water is initially introduced and components IIIa, IIIb and Vb are added with stirring and stirred with a high-speed stirrer at approximately 3000 rpm. Component VIII is then added and stirring continued for a further 60 minutes at 1800 rpm. This aqueous slurry is then added to the premixed components I and IIa. The mixture is then stirred for 10 minutes at 1800 rpm.

In Example 1.1, components VI and VII are added and stirred in at the end.

EXAMPLE 1a (Comparison Example)

Production process as in Example 1 (Comparison), but with the composition stated in Table 1.

EXAMPLE 2

General instructions for the production of the coating material according to the invention (see Table 1 for quantities, Table 2 for test results):

1) component IIa is initially introduced, then
2) in the following order, component VIII, components V and components IIIa and IIb are added with stirring and then intensively dispersed for 20 minutes at approximately 3000 rpm,
3) water and component IVa are then added with stirring and homogenized, then component IIc is added and dispersed for 20 minutes at approximately 1000 rpm,
4) finally, component I and component VII are added and stirred for a further 20 minutes.

EXAMPLE 3

General instructions for the production of the coating material according to the invention (see Table 1 for quantities, Table 2 for test results):

1) 10 to 40% of component IIa is initially introduced, then 2) in the following order, component VIII, components V and components IIIa and IIb are added with stirring and then intensively dispersed for 20 minutes at approximately 3000 rpm, 3) component IVa, optionally water and the remainder of component IIa are then added with stirring; once a homogenous distribution has been obtained, component IIb is added and dispersed for 20 minutes at approximately 1000 rpm, 4) finally, component I and component VII are added and stirred for a further 20 minutes.

TABLE 1

| Example no./ Component | 1 (comparison) | 1.1 (comparison) | 1a | 2a | 2b | 2c | 2d |
|---|---|---|---|---|---|---|---|
| Water | 14.4 | 10.0 | 17.6 | 17.6 | 10.6 | 20.0 | — |
| Ia | 50.5 | 63.8 | 50.5 | 50.5 | 34.0 | 59.6 | 33.4 |
|  | (23.7) | (30.0) | (23.7) | (23.7) | (16.0) | (28.0) | (15.7) |
| IIa | 115.7 | 166.7 | 115.7 | 115.7 | 141.4 | 101.4 | 115.7 |
|  | (34.7) | (50.0) | (34.7) | (34.7) | (42.4) | (30.4) | (34.7) |
| IIb | — | — | — | — | — | — | — |
| IIc | — | — | — | — | — | — | — |
| IIIa | 4.9 | 2.4 | 4.9 | 4.9 | 4.9 | 4.9 | 4.9 |
|  | (5.3) |  | (4.9) | (4.9) | (4.9) | (4.9) |  |
| IIIb | 11.3 | 5.0 | 11.3 | 11.3 | 11.3 | 11.3 | 11.3 |
|  | (11.3) | (5.0) | (11.3) | (11.3) | (11.3) | (11.3) | (11.3) |
| IVa | — | 5.0 | 6.9 | 6.9 | 6.9 | 6.9 | 6.9 |
|  |  | (6.9) | (6.9) | (6.9) | (6.9) | (6.9) | (6.9) |
| Va | — | — | — | — | 17.4 | 17.4 | — |
|  |  |  |  |  | (17.4) | (7.4) |  |
| Vb | 17.4 | — | 17.4 | 17.4 | — | — | — |
|  | (17.4) |  | (17.4) | (17.4) |  |  |  |
| Vc | — | 7.3 | — | — | — | — | 17.4 |
|  |  | (7.3) |  |  |  |  | (17.4) |
| VIa | — | 4.0 | 4.0 | 4.0 | 4.0 | 4.0 | 44.0 |
|  |  | (0.8) | (0.8) | (0.8) | (0.8) | (0.8) | (0.8) |
| VIIa | — | 0.7 | — | 0.7 | 0.7 | 0.7 | 0.7 |
|  |  | (0.1) |  | (0.1) | (0.1) | (0.1) | (0.1) |
| VIIIa | 0.2 | 0.2 | 0.2 | 0.2 | 0.2 | 0.2 | 0.2 |
|  | (0.2) | (0.2) | (0.2) | (0.2) | (0.2) | (0.2) | (0.2) |

| Example no./ Component | 2e | 2f | 3a | 3b | 3c | 3d | 3e |
|---|---|---|---|---|---|---|---|
| Water | 17.6 | 10.0 | 27.6 | 17.6 | 5.8 | 5.8 | 5.8 |
| Ia | 50.5 | 63.8 | 50.5 | 50.5 | 21.8 | 21.8 | 21.8 |
|  | (23.7) | (30.0) | (23.7) | (23.7) |  |  |  |
| IIa | 115.7 | 166.7 | — | 15.7 | 50.0 | 50.0 | 50.0 |
|  | (34.7) | (50.0) |  | (34.7) |  |  |  |
| IIb | — | — | 69.4 | — | — | — | — |
|  |  |  | (34.7) |  |  |  |  |
| IIc | — | — | — | — | 0.26 | 0.53 | 1.5 |
| IIIa | 4.9 | 2.4 | 4.9 | 4.9 | 2.1 | 2.1 | 2.1 |
|  | (4.9) | (4.9) | (2.4) |  | (4.9) | (4.9) |  |
| IIIb | — | 5.0 | 11.3 | 11.3 | — | — | — |
|  |  | (5.0) | (11.3) | (11.3) |  |  |  |
| IVa | 18.2 | 5.0 | 6.9 | 6.9 | 7.9 | 7.9 | 7.9 |
|  | (18.2) | (5.0) | (6.9) | (6.9) |  |  |  |
| Va | — | — | — | — | — | — | — |
| Vb | — | — | — | — | — | — | — |
| Vc | 17.4 | 7.3 | 17.4 | 17.4 | 7.5 | 7.5 | 7.5 |
|  | (17.4) | (7.3) | (17.4) | (17.4) |  |  |  |
| VIa | 4.0 | 4.0 | 4.0 | 4.0 | 1.7 | 1.7 | 1.7 |
|  | (0.8) | (0.8) | (0.8) | (0.8) |  |  |  |
| VIIa | 0.7 | 0.7 | 0.7 | 0.7 | 0.3 | 0.3 | 0.3 |
|  | (0.1) | (0.1) | (0.1) | (0.1) |  |  |  |
| VIIIa | 0.2 | 0.2 | 0.2 | 0.2 | 0.1 | 0.1 | 0.1 |
|  | (0.2) | (0.2) | (0.2) | (0.2) |  |  |  |

(—) these values are solid contents.

TABLE 2

| Examples | 1 | 1.1 | 1a | 2a | 2b | 2c | 2d |
|---|---|---|---|---|---|---|---|
| Tests | | | | | | | |
| Efflorescence | 0 | 0* | 0 | 0 | 0 | 0 | 0 |
| Hardness | 55 | 57 | 58 | 60 | 53 | 53 | 60 |
| Crosshatching | 10 | 10 | 0 | 0 | 0 | 0 | 0 |
| Cracking | 4 | 3–4 | 2–3 | 1 | 3 | 0 | 3 |
| Levelling Texture | 1 | 3 | 1 | 1 | 1 | 0–1 | 1 |
| Storage stability of mixture | >4 mo | <2 wk | >4 mo | >4 mo | >4 mo | >4 mo | >4 mo |

| Examples | 2e | 2f | 3a | 3b | 3c | 3d | 3e |
|---|---|---|---|---|---|---|---|
| Tests | | | | | | | |
| Efflorescence | 0 | 0* | 0 | 0 | 0 | 0 | 0 |
| Hardness | 59 | 50 | 58 | 58 | 65 | 69 | 72 |
| Crosshatching | 0 | 0 | 0 | 0 | 0 | 0 | 0 |
| Cracking | 0 | 0 | 0 | 1 | 0 | 0 | 0 |
| Levelling Texture | 3 | 1 | 1 | 1 | 1 | 1 | 1 |
| Storage stability of mixture | >4 mo | >4 mo | >4 mo | >4 mo | >4 mo | >4 mo | >4 mo |

Parameters & test conditions for evaluation of coatings

The coating material is applied onto fresh, wet concrete; evaluation is performed after 6 hours' drying at 60° C. in a steam chamber.

Efflorescence
  Chalk/carbonate efflorescence is evaluated
  0=no efflorescence

Hardness
  König pendulum hardness to DIN 53 157

Crosshatching
  10 crosshatched cuts in each direction with 2 mm spacing; the number of fields to flake off is stated in %

Cracking
  Microcracking is evaluated
  0=no cracks
  1=few cracks
  5=deep crack Levelling
  0=no texture
  1=slight texture
  5=very uneven surface It will be understood that the specification and examples are illustrative but not limitative of the present invention and that other embodiments within the spirit and scope of the invention will sugest themselves to those skilled in the art.

We claim:

1. A coating mixture produced by
   initially introducing about 30 to 50 wt. % of at least one reactive extender B, as an aqueous dispersion,
   adding 0 to about 5% of wetting agent G, as an additive, about 10 to 40 wt. % of at least one unreactive pigment or unreactive extender C, optionally adding a further quantity of B, wherein the total amount of all B added is at most about 50 wt. %, about 0.1 to 10 wt. % of at least one reactive (oligo)silane E and about 5 to 20 wt. % of at least one lamellar or fibrous extender D, which differs from B and C, with stirring, which is then continued for an additional 5 to 60 minutes, and then adding 0 to about 35 wt. % of at least one additive G and about 15 to 30 wt. % of at least one polysiloxane A with stirring; all wt. % amounts being based on total weight of mixture.

2. A mixture according to claim 1, additionally containing about 0.2 wt. % of at least one catalyst (component F) by total weight of mixture.

3. A mixture according to claim 1, wherein component A is at least one hydroxy- or alkoxy-functional polysiloxane which forms an emulsion with water, or with an additional solvent mixed with water, and an emulsifier.

4. A mixture according to claim 1, wherein the extender B is at least one of colloidal silica in the form of a silica sol, an alkyl siliconate, and aluminum hydroxide.

5. A mixture according to claim 1, wherein component B is an aqueous silica sol dispersion having a solids contents of about 20 to 60 wt. %.

6. A mixture according to claim 1, wherein component B comprises silica sol and zinc oxide.

7. A mixture according to claim 1, wherein the reactive (oligo)silane (component E) is a (partial) hydrolysis product of at least one of 3-amiopropyl-, 1,2-epoxy-propyl- or 3-hydroxypropyltrisalkoxysilane.

8. A mixture according to claim 1, wherein component G further comprises styrene/acrylate or acrylate dispersion.

9. A process for the preparation of a mixture which comprises
   initially introducing about 30 to 50 wt. % of at least one reactive extender B as an aqueous dispersion,
   adding 0 to about 5% of wetting agent G as an additive, about 10 to 40 wt. % of at least one unreactive pigment or unreactive extender C, optionally adding a further quantity of B, wherein the total of all B is at most about 50 wt. %, about 0.1 to 10 wt. % of at least one reactive (oligo)silane E and about 5 to 20 wt. % of at least one lamellar or fibrous extender D, which differs from B and C, with stirring and then, after all components have been added, stirring for an additional 5 to 60 minutes, and subsequently adding 0 to about 35 wt. % of at least one additive G and about 15 to 30 wt. % of at least one polysiloxane A with stirring; all wt. % amounts being based on total weight of mixture.

10. A process for the preparation of a coated article which comprises applying a mixture according to claim 1 to an article, and drying for about 1 to 600 minutes at a temperature of <1000° C.

11. A process according to claim 10, wherein the mixture is applied to an article during the production of said article.

12. A process according to claim 10, wherein the article to which the mixture is applied is a construction material, a facing or a rendering.

\* \* \* \* \*

UNITED STATES PATENT AND TRADEMARK OFFICE
CERTIFICATE OF CORRECTION

PATENT NO. : 5,847,037
DATED : December 8, 1998
INVENTOR(S) : Mazanck, et al.

It is certified that error appears in the above-identified patent and that said Letters Patent is hereby corrected as shown below:

Title Page      [22] Filed: Delete " Jul 24, 1996 " and substitute -- Aug. 1, 1996 --

Col. 11, last line      Delete " 1000°C " and substitute -- 100°C --

Signed and Sealed this

Tenth Day of August, 1999

Attest:

Q. TODD DICKINSON

Attesting Officer      Acting Commissioner of Patents and Trademarks